United States Patent [19]

Kenney et al.

[11] Patent Number: 5,403,808

[45] Date of Patent: Apr. 4, 1995

[54] SORBENTS FOR FLUE GAS DESULFURIZATION

[75] Inventors: Malcolm E. Kenney; Ray-Kuang Chiang, both of Cleveland, Ohio

[73] Assignee: Case Western Reserve University, Cleveland, Ohio

[21] Appl. No.: 88,448

[22] Filed: Jul. 7, 1993

[51] Int. Cl.$^6$ .......................... B01J 20/04; B01J 20/10
[52] U.S. Cl. .................................. 502/411; 502/407
[58] Field of Search ................. 502/407, 409, 411, 412

[56] References Cited

U.S. PATENT DOCUMENTS 4,284,528  8/1981  Lancet et al. ........................ 502/411

FOREIGN PATENT DOCUMENTS 0166932 10/1983  Japan .................................. 502/411
0177136 10/1983  Japan .................................. 502/411
2090919  3/1990  Japan .................................. 502/411
2146977  5/1985  United Kingdom ................. 502/411

*Primary Examiner*—Carl F. Dees
*Attorney, Agent, or Firm*—Fay, Sharpe, Beall, Fagan, Minnich & McKee

[57] ABSTRACT

The subject invention relates to a process for the production of a sorbent for $SO_2$ comprising mixing a source of $Ca_3SiO_5$ admixed with about 3% of a compound such as $CaSO_4 \cdot 2H_2O$ that facilitates the conversion of the $Ca_3SiO_5$ to the desired product, or $Ca_2SiO_4$, or both the mixture and $Ca_2SiO_4$ with an excess of water; adding milling media to the mixture; and, agitating the mixture including the milling media for from about 1 hour to about 96 hours at a temperature of about ambient temperature to about 85° C., such that a finely divided sorbent including C—S—H and $Ca(OH)_2$ as its main active components is formed.

The invention further relates to the foregoing process wherein the source of $Ca_3SiO_5$ admixed with about 3% of a compound such as $CaSO_4 \cdot 2H_2O$ that facilitates the conversion of the $Ca_3SiO_5$ to the desired product, or $Ca_2SiO_4$, or both the mixture and $Ca_2SiO_4$ is mixed with an excess of water in the presence of a source of silica.

19 Claims, 1 Drawing Sheet

5,403,808

SORBENTS FOR FLUE GAS DESULFURIZATION

FIELD OF THE INVENTION

The subject invention relates to a process for the production of a sulfur dioxide sorbent useful for the removal of $SO_2$ from flue gas. Particularly, the invention relates to a process for the hydration of a reactant containing $Ca_3SiO_5$ admixed with about 3% of a compound such as gypsum that facilitates the conversion of the $Ca_3SiO_5$ to the desired product, or $Ca_2SiO_4$, or both the mixture and $Ca_2SiO_4$, to any of which optionally has been added a silica source, to a finely divided product whose main active components include the calcium silicate $CaO$—$SiO_2$—$H_2O$, or in cement chemist's notation C—S—H, and calcium hydroxide. The invention also relates to the sorbent itself and the use thereof for the desulfurization of sulfur-containing flue gas.

BACKGROUND OF THE INVENTION

It has long been known that the flue gas produced at coal-burning facilities and power plants contains dangerous levels of toxic $SO_2$ gas. Many methods have been advanced over the years as a means of desulfurizing the emissions from such facilities.

U.S. Pat. Nos. 4,931,264 and 4,804,521 proposed the use of a system which combines $Ca(OH)_2$ and fly ash to solve this problem. The process disclosed by these patents involves contacting the sulfur-containing gas with a slurry containing a calcium alkali and a calcium-reactive silica or alumina which has been heated to a temperature sufficient to produce the sulfur-absorbing components. While this process is effective for removing sulfur from flue gas, it has a number of drawbacks. Among these drawbacks is the fact that only some of the components of the reaction mixture are capable of yielding products that can take up $SO_2$ efficiently. Thus, much of the sorbent produced is composed of species which do not take up $SO_2$ efficiently. The average percent conversion or utilization of the calcium for groups of representative $Ca(OH)_2$-fly ash sorbents made from Illinois, Appalachian, and Powder River basin fly ashes is only 42%, 48%, and 52% as measured with a sandbed sorption test apparatus loaded with 1 g of sorbent and 40 g of sand through which a gas composed of 1000 ppm of $SO_2$ in $N_2$ at a temperature of 64° C. and a relative humidity of 60% is passed at a flow rate of 5 L/min for 1 hour. This is disclosed in Singer et al., "Suitability of Available Fly Ashes In Advocate Sorbents" 1991 EPRI-EPA-DOE $SO_2$ Control Symposium. Some of the species which do not take up $SO_2$ efficiently are toxic, and all must ultimately be disposed of. The transportation of spent sorbent and other byproducts and the subsequent disposal thereof is very costly and will become more costly as disposal sites become filled.

It has remained for the subject invention to solve the foregoing problems by the development of a process which uses a reactant containing $Ca_3SiO_5$ admixed with about 3% of a compound such as $CaSO_4 \cdot 2H_2O$ that facilitates the conversion of the $Ca_3SiO_5$ to the desired product, or $Ca_2SiO_4$, or both the admixture and $Ca_2SiO_4$, preferably ordinary Portland cement, as an ingredient in a process that produces a finely divided product whose main active components include C—S—H and $Ca(OH)_2$.

Therefore, it is an object of the subject invention to provide a process which uses a readily available starting ingredient to produce a desulfurization product.

It is another object of this invention to produce a finely divided product whose main active components include C—S—H and $Ca(OH)_2$.

It is yet another object of this invention to produce a sorbent which has a percent conversion or utilization of its calcium of better than about 50% under specified conditions common in the industry and set forth hereinafter, with an apparatus loaded with 0.5 g of sorbent and 20 g sand through which a gas composed of 2000 ppm of $SO_2$ in $N_2$ at temperature of 60° C. and a relative humidity of 60% is passed at a flow rate of 1 L/min for 1 hour.

It is yet another object of this invention to produce a sorbent containing only small amounts of species which take up $SO_2$ inefficiently and which are hazardous.

It is a further object of this invention to provide a desulfurization sorbent which is recyclable once spent.

SUMMARY OF THE INVENTION

The subject invention relates to a process for the production of a sorbent for $SO_2$ comprising mixing a source of $Ca_3SiO_5$ admixed with about 3% of a compound such as $CaSO_4 \cdot 2H_2O$ that facilitates the conversion of the $Ca_3SiO_5$ to the desired product, or $Ca_2SiO_4$, or both the mixture and $Ca_2SiO_4$ with an excess of water; adding milling media to the mixture; and, agitating the mixture including the milling media for from about 1 hour to about 96 hours at a temperature of about ambient temperature to about 85° C., such that a finely divided sorbent including C—S—H and $Ca(OH)_2$ as its main active components is formed.

The invention further relates to the foregoing process wherein the source of $Ca_3SiO_5$ admixed with about 3% of a compound such as $CaSO_4 \cdot 2H_2O$ that facilitates the conversion of the $Ca_3SiO_5$ to the desired product, or $Ca_2SiO_4$, or both the mixture and $Ca_2SiO_4$ is mixed with an excess of water in the presence of a source of silica.

DETAILED DESCRIPTION OF THE INVENTION

Figure 1:
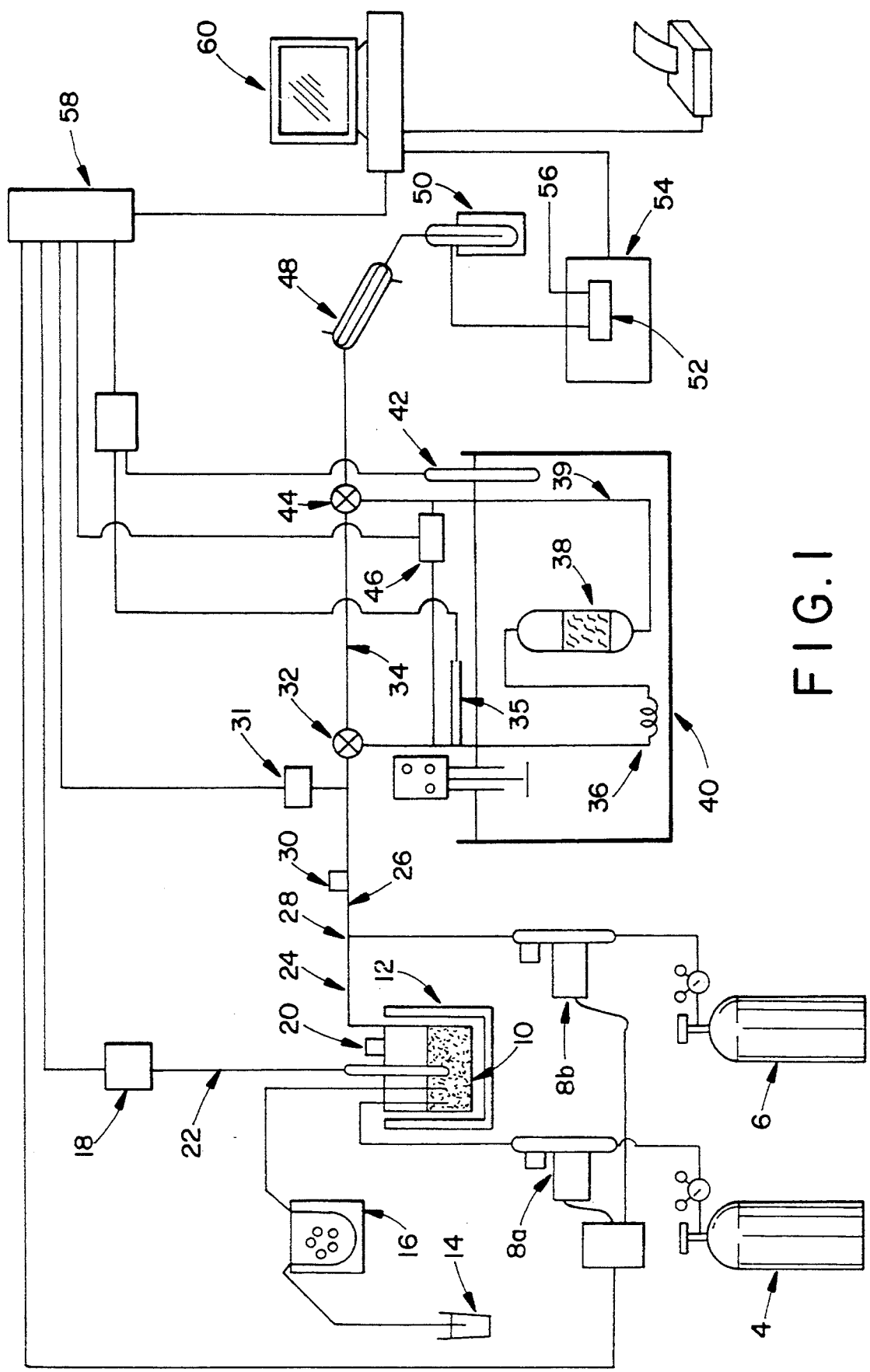
FIG. 1 is a schematic diagram of a sand-bed sorption system.

The invention disclosed herein relates to calcium-based sorbents for the desulfurization of flue gas. The sorbents are a product of the hydration of a reactant containing tricalcium orthosilicate admixed with about 3% of a compound such as gypsum that facilitates the conversion of the $Ca_3SiO_5$ to the desired product, or dicalcium orthosilicate, or both the mixture and $Ca_2SiO_4$, a reactant referred to hereinafter as the "silicate reactant". Portland cement is a readily available source, or silicate reactant. Other silicate reactants include any source known to those skilled in the art.

The silicate reactant and an excess of water may optionally be mixed in the presence of a silica source to cause the conversion of some of the $Ca(OH)_2$ produced to C—S—H. Typical silica sources for this purpose include but are not limited to fumed silica, tripoli, diatomite, pumice, glass (i.e. 350 mesh bottle glass), and rottenstone. The silica content in these silica sources ranges from about 100% silica in fumed silica to about 65% silica content in rottenstone, all other sources recited having silica content therebetween. The surface area of the silica source is preferably high, typically about 10 meters$^2$/gram or more, so that it will be quite reactive. In the interest of economy and sorbent efficiency, the optimum source of silica is one which is readily available, is comparatively inexpensive, and has a relatively high silica content. While fly ash can be used, it is not as desirable as those mentioned above because it has a low silica content and a high non-silica content.

In the preferred embodiment of the invention, the silicate reactant is cement. It is to be understood that hereinafter the use of the term "cement" is not meant to limit the invention to cement as the only source of $Ca_3SiO_5$ and $Ca_2SiO_4$, but rather to indicate that cement is the preferred source thereof. The preferred cement used to produce the subject sorbent is Type I or ordinary Portland cement. This cement contains about 50–70% $Ca_3SiO_5$ and about 15–30% $Ca_2SiO_4$, and about 5% $CaSO_4 \cdot 2H_2O$.

The desulfurization sorbent which is the subject hereof may be produced by either mixing the silicate reactant with an excess of water in the presence of a milling media, or by adding the silicate reactant to an excess of water, with constant stirring or agitation. The addition of a silica source is optional to either method. In either process, the hydration of the silicate reactant, with or without the silica source, under the stated conditions produces calcium silicate hydrate, $CaO-SiO_2-H_2O$, or in cement chemists notation C—S—H, together with $Ca(OH)_2$. C—S—H and $Ca(OH)_2$ are the main active components of the sorbent.

Preferably, the process involves mixing the silicate reactant source with an excess of water in the presence of milling media. Suitable milling media include glass spheres or beads and other media, such as $ZrO_2$ cylinders, steel rods and other milling media, which will be readily known to those skilled in the art. The milling may be done while the mixture is continuously or intermittently agitated for a period of time ranging from about 1 hour to about 96 hours, preferably from about 3 hours to about 72 hours. While the foregoing agitation may be done at elevated temperatures, up to about 85° C., it is not necessary to do so because the hydration reactions are not greatly accelerated by elevated temperatures. The mixture may, therefore, be agitated and milled at room temperature.

The addition of glass spheres or other suitable milling media to the mixture of silicate reactant and water, and optionally a silica source, helps to ensure that a high proportion of the available $Ca_2SiO_4$ and $Ca_3SiO_5$ are hydrated. In the normal reaction cycle, as the reaction proceeds the surface of the silicate reactant becomes coated with reaction products. Once a significant portion of the surface of the silicate reactant has been coated, the reaction process slows greatly. The addition of milling media to the mixture, however, causes the surface of the silicate to undergo continual abrasion, resulting in the constant exposure of unreacted silicate surface. Consequently, the process rapidly achieves the maximum potential of the starting material for formation of C—S—H and $Ca(OH)_2$.

Alternatively, mixing of the cement, water, and silica source, if used, can be accomplished by any method known to those skilled in the art in the absence of milling media. For example, the cement and silica source, if used, can be poured into water while stirring to achieve the desired mixture, or slurry. The mixture may then be continuously or intermittently agitated for from about 3 hours to about 1 month or more. As in the preferred embodiment, agitation may be done at elevated temperature, up to about 85° C. or at ambient temperature. The C—S—H produced during the process which is the subject hereof has a honeycomb morphology and thus has an extremely high surface area and is porous. The absorption of the $SO_2$ is facilitated by the high surface area and porosity of the C—S—H.

The product of the foregoing process, which is a slurry, may be used as such for flue gas desulfurization. Alternatively, the solid content of the slurry may be isolated, by such means as filtration or other appropriate separating process, dried, and this solid may be used for desulfurization. In application, the percent conversion or utilization of the calcium in the subject sorbent is about 65% as measured with a sand-bed sorption apparatus loaded with about 0.5 g of sorbent and about 20 g sand through which a gas composed of 2000 ppm of $SO_2$ in $N_2$ at a temperature of about 60° C. and a relative humidity of about 60% is passed at a flow rate of about 1 L/min for 1 hour.

Because the materials combined to produce the sorbent in the subject process are chosen so that they yield only relatively small amounts of byproduct species, problems related to the disposal of the spent sorbent in landfills or by other means because of the presence of these species, whether non-toxic or toxic, are negligible. If the preferred cement silicate reactant is used, the spent sorbent is recyclable at a cement production facility as a raw material for cement clinker formation. This alleviates problems associated with the transport and disposal of spent sorbent. The sorbent produced according to the foregoing disclosure may be introduced into the emission chamber, flue, or other apparatus of a given facility or power plant by any known method. Upon introduction of the sorbent, it is contacted with the $SO_2$-containing emissions. The sorbent may be in the form of a slurry or may be in the form of dry powder, depending upon the equipment of the specific facility where the sorbent is being used. Once $SO_2$ uptake has been completed, the used sorbent can be removed from the emission stream by any known filtering or removal method, such as by a trap bag or cloth filter. As was previously stated, once used, the sorbent disclosed herein is recyclable.

Now, with reference to FIG. 1, a bench-scale sand-bed sorption system will be described. One skilled in the art will be able to easily adapt the following for commercial scale application.

FIG. 1 is a schematic drawing of a sand-bed sorption system. The feed gases employed may be $N_2$ 4 and a mixture of $N_2$ and $SO_2$ 6. These gases are directed to mass flow meters and controllers 8a,b by means of stainless steel tubing. The $N_2$ 4 from the $N_2$ controller 8a is directed to a stainless steel evaporation chamber 10. Simultaneously, water from reservoir 14, which has been preweighed, is introduced into the chamber 10 through a peristaltic pump 16. The chamber is heated with a heating mantle 12 and its temperature is controlled with a PID temperature controller 18. The chamber temperature is monitored with a thermocouple 22. A pressure relief valve 20 is connected to the chamber to relieve any inadvertent pressure rises. The humidified $N_2$ gas product 24 in the chamber 10 is directed to a tee 28. The $SO_2$—$N_2$ mixture from the $SO_2$—$N_2$ controller 8b is directed to this same tee 28 and is mixed with the humidified $N_2$ 24 at this point to produce mixture 26. Just beyond the tee 28, a second relief valve 30 is connected to the system. Further on, an absolute pressure transducer 31 is connected to the system, and beyond this transducer 31, a three-way valve 32 is connected. Here, the gas 26 is directed either to a reactor bypass 34 or to the reactor 38. If it is directed to the reactor 38, it passes through a heat exchanger coil 36 and then through the reactor 38. The reactor 38 is a sand-bed type reactor and is made of glass. Appropriate amounts of sand and sorbent produced as described herein have been mixed and charged to the reactor 38. Both the coil 36 and reactor 38 are immersed in a heated constant-temperature water bath 40 held at 60° C., monitored by water bath thermocouple 42. From the reactor 38, the gas 39 is directed to another three-way valve 44, to which the gas from the bypass 34 is also directed. A differential pressure transducer 46 is connected to the system both before the heat exchanger coil and after the reactor. The gas 39 from the three-way valve 44 is then directed to a glass condenser 48. From the far side of the evaporation chamber 10 to the condenser 48, the exposed tubing is heated with heating tapes. The gas 39 from the condenser 48 is directed to a trap immersed in an ice-salt mixture held in a dewar 50. The resulting dehumidified gas is directed to a fused silica flow-through gas cell 52 mounted in a research grade UV-Vis spectrophotometer 54. The spectrophotometer is connected to a PC 60 and is controlled with the PC through a proprietary computer program. Finally, the gas is directed to a vent 56.

The data from the $N_2$ flow meter 8a, the $SO_2$—$N_2$ flow meter 8b, the evaporation chamber thermocouple 22, the absolute pressure transducer 31, the gas line thermocouple 35, the differential pressure transducer 46, and the water bath thermocouple are fed to an acquisition board 58 and then to the PC 60. The data from the spectrophotometer are also fed to the PC. All these data are processed with the aid of commercially available programs. The water reservoir 14 is then re-weighed.

The raw data given by the system include the absorbance of the incoming gas, a plot of absorbance versus time for the blank, and a plot of absorbance versus time for the sorbent. The relationship between absorbance and $SO_2$ concentration is established with a calibration curve. This is constructed using a set of gas mixtures of known concentration.

From the data collected and the calibration curve, the reactivity factor of the sorbent, R, in mmole of the $SO_2$ sorbed per gram of sorbent is determined with the equation $$R = \frac{\sum_{i=1}^{n}(C_2 - C_{4i})rt - \sum_{i=1}^{n}(C_2 - C_{3i})rt}{S}$$

where $C_2$ is the $SO_2$ concentration of the incoming gas in mmole/L, $C_{3i}$ is the $So_2$ concentration of the gas after being passed through the sand alone in mmole/L, $C_{4i}$ is the $SO_2$ concentration of the gas after being passed through the sand and sorbent in mmole/L, r is the rate of flow of the incoming gas in L/sec, t is the time between absorbance measurements in seconds, n is the number of absorbance measurements made, and S is the weight of sorbent in grams.

The following Examples set forth the process according to the subject disclosure for producing various sorbents within the scope of the invention. Table I sets forth the $SO_2$ uptake data for the Examples.

EXAMPLE 1

A mixture of Type I Portland cement (Medusa Cement Co., complying with ASTM C-150, 5 g), water (50 mL) and glass beads (Pyrex, 3 mm diameter, 25 g) in a capped polyethylene bottle (125 mL) was shaken (about 2 Hz) with a wrist shaker at room temperature for 3 days. The resulting slurry was filtered and the solid was dried under vacuum (about 60 Torr, about 60°) for 10 hours.

The approximate composition of the product as visually estimated from its X-ray powder diffractometry pattern is given in Table I. Also given in Table I is the uptake by the product of $SO_2$ from a simulated flue gas as determined with a bench-scale sand-bed sorber. The composition of the gas was 2,000 ppm $SO_2$, enough water to give about 60% relative humidity, and the balance $N_2$. The duration of the gas flow was 1 hour, the rate of flow of the gas was 1 L/min, and the temperature of the sorbent was 60°.

EXAMPLE 2

A mixture of the same cement (5 g), water (50 mL) and zirconia beads (25 g, 2 mm diameter) in a capped Teflon bottle (150 mL) was shaken (about 2 Hz) with a wrist shaker at about 60° for 9 hours. The resulting slurry was filtered and the solid was dried under vacuum (about 60 Torr, about 60°) for 10 hours.

The estimated composition and the $SO_2$ uptake of the product are given in Table I.

EXAMPLE 3

A mixture of the same cement (5 g), water (50 mL), fumed silica (Alfa 99.9%, 1 g) and glass beads (25 g, 3 mm diameter) in a capped polyethylene bottle (125 mL) was shaken (about 2 Hz) with a wrist shaker at room temperature for 3 days. The resulting slurry was filtered and the solid was dried under vacuum (about 60 Torr, about 60°) for 10 hours.

The estimated composition and the $SO_2$ uptake value of the product are given in Table I.

EXAMPLE 4–9

These examples, respectively, consisted of preparations like that of Example 3 except that the fumed silica was substituted by diatomite (Fisher Scientific, powder, 1 g), tripoli (Malvern Minerals, to pass 200 mesh, 1 g), pumice (Ward's Natural Science Establishment, to pass 270 mesh, 1 g), soda-lime glass (commercial bottle, to pass 270 mesh, 1 g), rottenstone (Keystone Filler and Manufacturing, to pass 200 mesh, 1 g), or fly ash (Clinch River Coal, unground 1 g).

The estimated compositions and the $SO_2$ uptake values of the products are given in Table I, these data having been compiled from the results of bench-scale sorption operations conducted in keeping with the disclosure herein.

TABLE I

| Example | Silica Source | Sorbent Composition as Estimated by X-Ray Powder Diffractometry Products (%) | | | | | SO$_2$ Uptake (mmole/g) |
| --- | --- | --- | --- | --- | --- | --- | --- |
| | | C—S—H | Ca(OH)$_2$ | β-Ca$_2$SiO$_4$ | SiO$_2$ | Ca$_4$Al$_2$SO$_{10}$12H$_2$O | |
| 1 | | 50 | 30 | 10 | | 10 | 6.5 |
| 2 | | 45 | 25 | 20 | | 10 | 5.9 |
| 3 | Fumed Silica | 60 | 10 | 10 | 10 | 10 | 6.6 |
| 4 | Diatomite | 60 | 10 | 10 | 10 | 10 | 6.0 |
| 5 | Tripoli | 60 | 10 | 10 | 10 | 10 | 6.0 |
| 6 | Pumice | 60 | 10 | 10 | 10 | 10 | 6.0 |
| 7 | Glass | 60 | 10 | 10 | 10 | 10 | 6.3 |
| 8 | Rottenstone | 60 | 10 | 10 | 10 | 10 | 6.2 |
| 9 | Fly Ash | 60 | 10 | 10 | 10 | 10 | 6.0 |

It is to be understood that the foregoing Examples have been included only to more clearly demonstrate the subject invention. As such, they are not intended to limit the same in any respect, the full scope of the invention being defined by the subject disclosure and the claims appended hereto, and including all feasible modifications and variations within the realm of the scope thereof.

Having described the invention, the following is claimed:

1. A process for the production of a desulfurizing agent comprising:
   mixing a silicate reactant containing at least one of Ca$_3$SiO$_5$ admixed with about 3% of a compound that facilitates conversion of said Ca$_3$SiO$_5$ to said desulfurizing agent of Ca$_2$SiO$_4$ with an excess of water in the presence of a source of silica;
   adding milling media to said mixture; and,
   agitating said mixture including said milling media for from about 1 hour to about 96 hours, at a temperature of from about ambient temperature to about 85° C., such that a finely divided desulfurizing agent having C—S—H and Ca(OH)$_2$ as main active components is formed.

2. The process of claim 1 wherein said compound that facilitates conversion of said Ca$_3$SiO$_5$ to said desulfurizing agent is gypsum.

3. The process of claim 1 wherein said compound that facilitates conversion of said Ca$_3$SiO$_5$ to said desulfurizing agent is CaSO$_4$.2H$_2$O.

4. The process of claim 1 wherein said silicate reactant is cement.

5. The process of claim 4 wherein said silicate reactant is Portland cement.

6. The process of claim 1 wherein said milling media is selected from the group consisting of glass beads, ZrO$_2$ cylinders, and steel rods.

7. The process of claim 1 wherein said source of silica contains at least about 60% silica.

8. The process of claim 1 wherein said source of silica is selected from the group consisting of fumed silica, tripoli, diatomite, pumice, glass, and rottenstone.

9. The process of claim 1 wherein said mixture is agitated for from about 9 to about 72 hours.

10. The process of claim 1 wherein said desulfurizing agent demonstrates an SO$_2$ uptake of at least about 6.0 mmole/gram.

11. A process for the production of a desulfurizing agent comprising:
    mixing a silicate reactant containing at least one of Ca$_3$SiO$_5$ admixed with about 3% of a compound that facilitates conversion of said Ca$_3$SiO$_5$ to said desulfurizing agent or Ca$_2$SiO$_4$ with an excess of water;
    adding milling media to said mixture; and,
    agitating said mixture including said milling media for from about 1 hour to about 96 hours at a temperature of from about ambient temperature to about 85° C. such that a finely divided desulfurizing agent having C—S—H and Ca(OH)$_2$ as main active components is formed.

12. The process of claim 11 wherein said compound that facilitates conversion of said Ca$_3$SiO$_5$ to said desulfurizing agent is gypsum.

13. The process of claim 11 wherein said compound that facilitates conversion of said Ca$_3$SiO$_5$ to said desulfurizing agent is CaSO$_4$.2H$_2$O.

14. The process of claim 11 wherein said silicate reactant is cement.

15. The process of claim 14 wherein said silicate reactant is Portland cement.

16. The process of claim 11 wherein said milling media is selected from the group consisting of glass beads, ZrO$_2$ cylinders, and steel rods.

17. The process of claim 11 wherein said mixture is agitated for from about 9 to about 72 hours.

18. The process of claim 11 wherein said desulfurizing agent demonstrates an SO$_2$ uptake of at least about 6.0 mmole/gram.

19. A flue gas desulfurizing agent comprising as its active ingredients C—S—H and Ca(OH)$_2$, said desulfurizing agent demonstrating flue gas SO$_2$ uptake of at least about 6.0 mmole/gram and at least about 50% utilization of said desulfurizing agent's calcium content.

* * * * *